(12) United States Patent
Huang et al.

(10) Patent No.: US 7,333,163 B2
(45) Date of Patent: Feb. 19, 2008

(54) FLAT DISPLAY MODULE

(75) Inventors: Chang-Yu Huang, Taipei Hsien (TW); Chuan-Pei Yu, I-Lan Hsien (TW)

(73) Assignees: Innocom Technology (Shenzhen) Co., Ltd., Shenzhen, Guangdong Province (CN); Innolux Display Corp., Chu-Nan, Miao-Li County (TW)

( * ) Notice: Subject to any disclaimer, the term of this patent is extended or adjusted under 35 U.S.C. 154(b) by 277 days.

(21) Appl. No.: 10/907,121

(22) Filed: Mar. 21, 2005

(65) Prior Publication Data
US 2006/0028595 A1 Feb. 9, 2006

(30) Foreign Application Priority Data
Aug. 3, 2004 (TW) .............. 93123270 A

(51) Int. Cl.
*G02F 1/1333* (2006.01)
*F21V 7/04* (2006.01)

(52) U.S. Cl. .................. 349/58; 349/60; 362/632; 362/633; 362/634

(58) Field of Classification Search .......... 349/58, 349/60; 362/632, 633, 634
See application file for complete search history.

(56) References Cited

U.S. PATENT DOCUMENTS

| | | | |
|---|---|---|---|
| 6,016,175 A | * | 1/2000 | Kim .............. 349/58 |
| 2001/0050731 A1 | * | 12/2001 | An et al. .......... 349/58 |
| 2003/0128307 A1 | * | 7/2003 | Ito et al. .......... 349/58 |

* cited by examiner

*Primary Examiner*—Michael H. Caley
(74) *Attorney, Agent, or Firm*—Wei Te Chung

(57) ABSTRACT

An exemplary flat display module includes a light guide plate, a prism sheet, a flat display panel, and plural fixing mechanisms. Each fixing mechanism includes a top fixing surface, a bottom fixing surface, and a fixing sidewall forming a fixing cavity for positioning the light guide plate and the prism sheet. The fixing mechanism further includes a panel-fixing tab for fixing the flat display panel.

25 Claims, 7 Drawing Sheets

FLAT DISPLAY MODULE

BACKGROUND OF INVENTION

1. Field of the Invention

The invention relates to a flat display module, and more particularly, to a flat display module comprising a specific fixing mechanism.

2. Description of the Prior Art

The recent years and advancements in technology have seen light, power saving, portable, and smart information products play an increasingly important role in our lives. The flat display module is an important component of these products. The LCD display module has the advantages of low power consumption, small volume and no radiation pollution, thus the LCD display module has been widely utilized in notebooks, PDAs, cell phones and other portable information products. In addition, the LCD display module is gradually replacing CRT monitors and traditional TVs.

Please refer to FIG. 1, which is a cross-sectional diagram of an LCD display module 10 according to the prior art. As shown in FIG. 1, the LCD module 10 comprises an LCD panel 12, a light guide plate 14 placed below the LCD display module 12, a diffusion sheet 18 and a prism sheet 16 placed between the LCD display panel 12 and the light guide plate 14, a reflecting sheet 20 placed below the light guide plate 14, and a frame 22. The LCD module 10 further comprises a light source (not shown) placed beside the light guide plate 14 to provide light to the LCD display panel 12 to show the desired picture. The light guide plate 14 is utilized to evenly transfer the lights generated by the light source to the diffusion sheet 18. The diffusion sheet 18 is subsequently utilized to scatter the lights to provide more uniform lighting to the LCD module. The prism sheet 16 is mainly utilized for centralizing the lights to increase the luminance of the LCD module 10. The diffusion sheet 18 can also be utilized to adjust the brightness difference so that the LCD panel can have a better brightness distribution. Here, the reflecting sheet 20 is utilized to reflect the lights from the bottom of the light guide plate 14 back to the light guide plate 14 in order to raise the utilization of the lights. In addition, the frame 22 is utilized for fixing the LCD panel 12, the prism sheet 16, the diffusion sheet 18, the light guide plate 14, and the reflecting sheet 20.

Traditionally, the frame 22 of the LCD display module 10 is made of metal, although plastic material can also be utilized to produce the frame 22. Regardless of the material, however, the frame 22 must have a certain thickness and weight in order to effectively fix the LCD display panel 12, the prism sheet 16, the diffusion sheet 18, the light guide plate 14 and the reflecting sheet 20. When the LCD module 10 is designed to be smaller, its size must comply with the thickness and weight constraints of the frame, in order to retain this fixing effectiveness. This limits the size and design of the end products, such as cell phones, DSC, DVC and PDAs.

As mentioned above, how to improve the design of the flat display module in order to provide a thinner fixing device that can more firmly fixing the flat display module becomes a big problem.

SUMMARY OF INVENTION

It is therefore one objective of the claimed invention to provide a flat display module comprising a specific fixing device to replace the function of the conventional frame in order to solve the above-mentioned problem that the weight and the thickness of the frame cannot be reduced.

According to an exemplary embodiment of the claimed invention, a flat display module is disclosed. The flat display module comprises: a light guide plate; at least one prism sheet place above the light guide plate; a flat display panel; and at least one fixing mechanism. The at least one fixing mechanism comprises a top fixing surface, a bottom fixing surface, a fixing sidewall, and at least one panel-fixing tab. The top fixing surface, the bottom fixing surface, and the fixing sidewall are connected to each other in order to form a fixing cavity in which to position and fix the edge of the light guide plate and the at least one prism sheet. The at least one panel-fixing tab is connected to the fixing sidewall for fixing the flat display panel.

In addition, a flat display module is disclosed. The flat display module comprises: a light guide plate; at least one optical film placed above the top of the light guide plate; a reflecting sheet placed below the bottom of the light guide plate; at least one single-side fixing mechanism which comprises: a top fixing surface, a bottom fixing surface, and a fixing sidewall; wherein the top fixing surface, the bottom fixing surface, and the fixing sidewall are connected to each other in order to form a fixing cavity in which to place and fix one side of the light guide plate, the optical film, and the reflecting sheet (where the side length of the single-side fixing mechanism is smaller than the side length of the light guide plate); and a flat display panel placed above the fixing mechanism and the optical film.

The present exemplary flat display module has a fixing mechanism comprising a top fixing surface, a bottom fixing surface, and a fixing sidewall, which form a fixing cavity to fix a light guide plate and an optical film. Furthermore, the fixing mechanism comprises a panel-fixing tab for fixing the flat display panel on the optical film. Therefore, the fixing mechanism can replace a conventional frame, so that the design of the size and the weight of the flat display module can be improved and the purpose of miniaturization of the flat display module can also be achieved.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
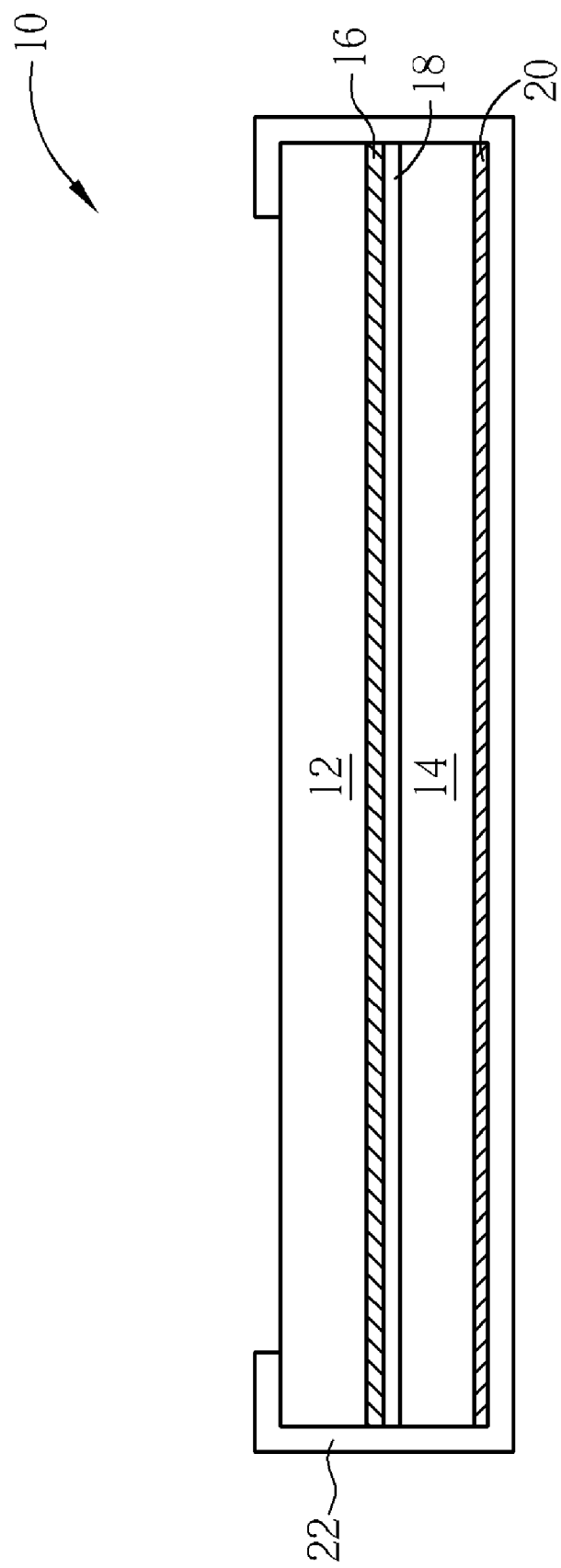
FIG. 1 is a cross-sectional diagram of an LCD display module according to the prior art.
Figure 2:
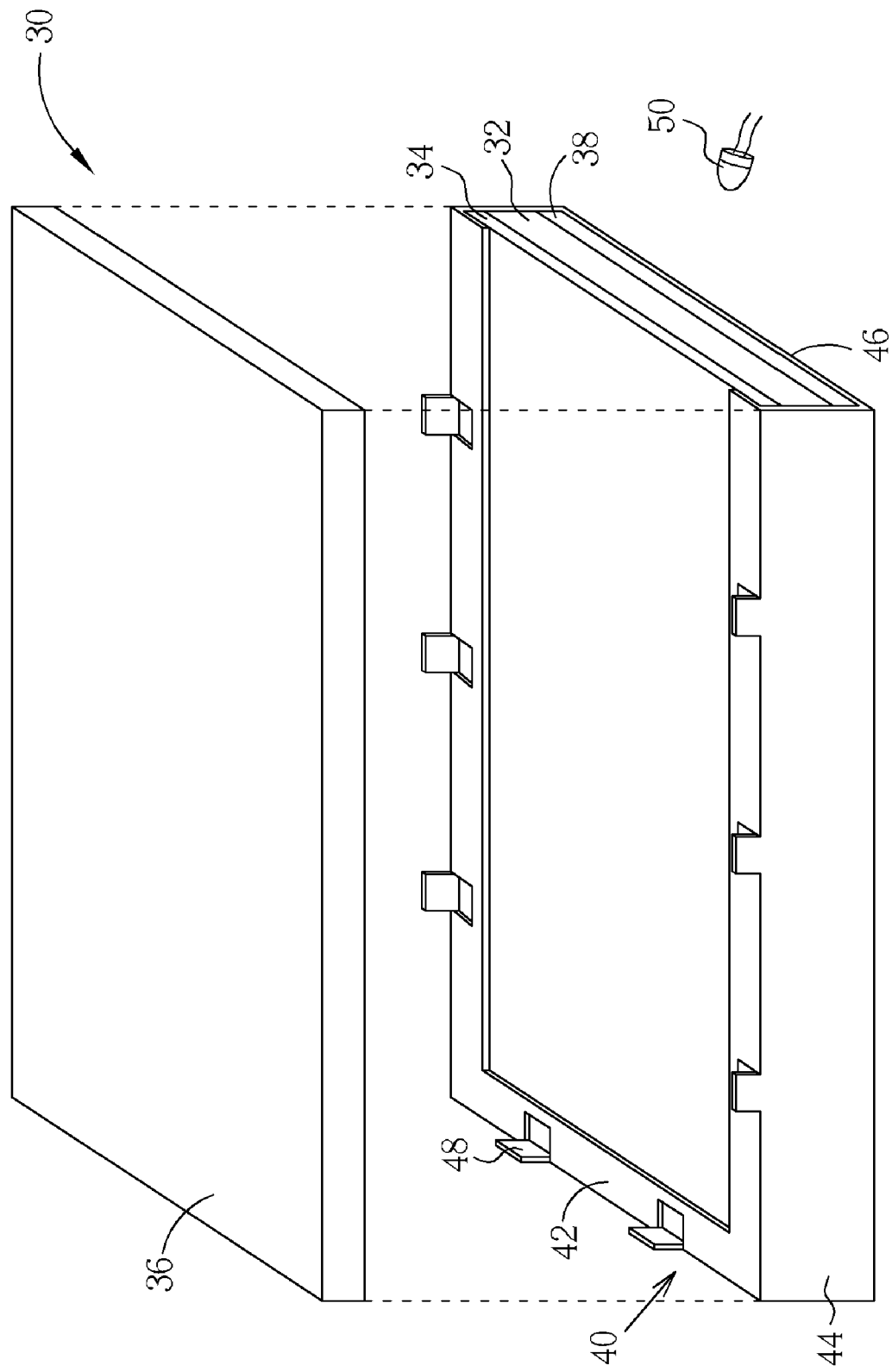
FIG. 2 is a diagram of a flat display module of a first embodiment according to the present invention.

Please refer to FIG. 2, which is a diagram of a flat display module 30 of a first embodiment according to the present invention. The flat display module 30 comprises a light guide plate 32, an optical film 34, a reflecting sheet 38, and a flat display panel 36. The optical film 34 and the reflecting sheet 38 are respectively placed on the top and bottom of the light guide plate 32. It should be noted that the flat display panel 36 is an LCD panel. The optical film 34 can be a diffusion sheet, a prism sheet, or a combination of the diffusion sheet and the prism sheet. Furthermore, the flat display module 30 may comprise several optical films with different functions according to the design and demands of the whole flat display module 30. Please note that in FIG. 2, only one optical film 34 is shown for illustration purposes; this is not a limitation.

The flat display module 30 further comprises a fixing mechanism 40 partially covering the light guide plate 32, the optical film 34, and the reflecting sheet 38. The fixing mechanism 40 comprises a top fixing surface 42, a bottom fixing surface 46, and a fixing sidewall 44, which are connected to each other to form a fixing cavity in which to place and fix the light guide plate 32, the optical film 34, and the reflecting sheet 38. The fixing mechanism 40 further comprises a plurality of panel-fixing tabs 48 connected to the fixing sidewall 44. These panel-fixing tabs 48 share the same plane with the fixing sidewall 44. When the flat display panel 36 is placed above the optical film 34 and the fixing mechanism 40, the panel-fixing tabs 48 are placed beside the sidewall of the flat display panel 36. The panel-fixing tabs 48 are made from plastic material, thereby ensuring they have elasticity to fix the flat display panel 36. This means the panel-fixing tabs 48 can fix the flat display panel 36 above the optical film 34 and the fixing mechanism 40.

In this embodiment, the size of the bottom fixing surface 46 is similar to the size of the light guide plate 32 and is connected to each fixing sidewall 44 so that the fixing mechanism 40 forms a box structure. Furthermore, as shown in FIG. 2, the light guide plate 32, the reflecting sheet 38, and the optical film 34 can be placed inside the fixing mechanism 40 by inserting them through a side of the fixing mechanism 40 not having the fixing sidewall 44.

The flat display module 30 further comprises at least one light generator 50, for example, LEDs or CCFLs, placed on one side of the light guide plate 32. As shown in FIG. 2, the light generator 50 can be placed on the side which is not covered by the fixing sidewall 44 of the light guide plate 32 in order to provide lights to the flat display panel 36.

Figure 3:
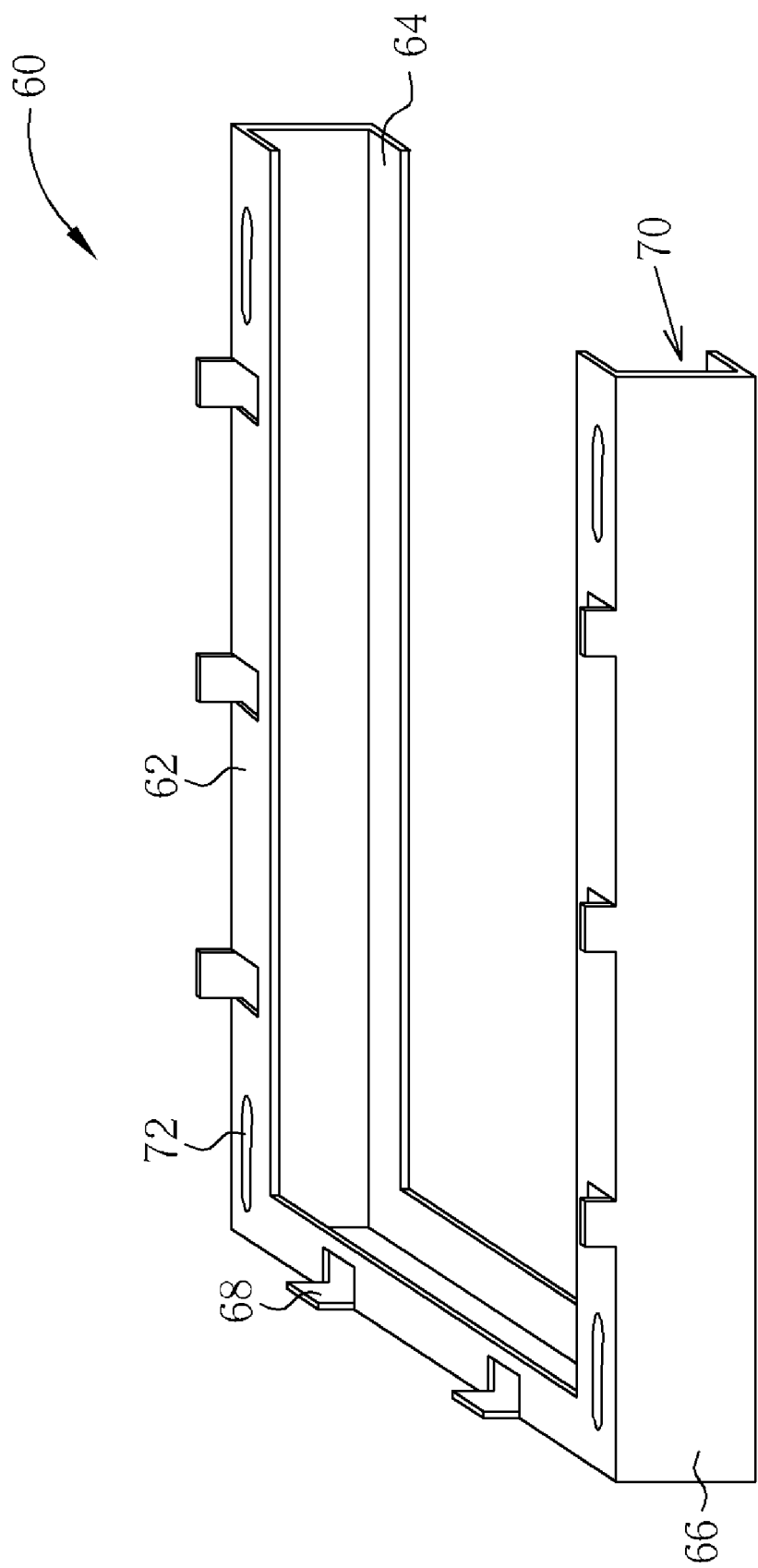
FIG. 3 is a diagram of a fixing mechanism of a flat display module of a second embodiment according to the present invention.

Please refer to FIG. 3, which is a diagram of a fixing mechanism 60 of the flat display module of a second embodiment according to the present invention. The fixing mechanism 60 is a hoof-shaped mechanism. The fixing mechanism 60 comprises a top fixing surface 62, a fixing sidewall 66, a bottom fixing surface 64, and a plurality of panel-fixing tabs 68. The top fixing surface 62 and the bottom fixing surface 64 have the same area. Furthermore, the top fixing surface 62, the bottom fixing surface 64, and the fixing sidewall 66 form a fixing cavity 70 for placing and fixing the light guide plate, the reflecting sheet, the diffusion sheet, and the prism sheet of the flat display module. As in the previous embodiment, the panel-fixing tabs 68 are utilized for fixing the flat display panel. This allows the number of the panel-fixing tabs 68 to be increased or decreased according to the design. In order to strengthen the fixing power of the flat display panel, a fixing glue 72 can be placed on the whole area or on certain positions of the top fixing surface 62. Therefore, when the flat display panel is placed above the fixing mechanism 60, the fixing glue 72 will be placed between the flat display panel and the fixing mechanism 60 so that the fixing power is strengthened.

Figure 4:
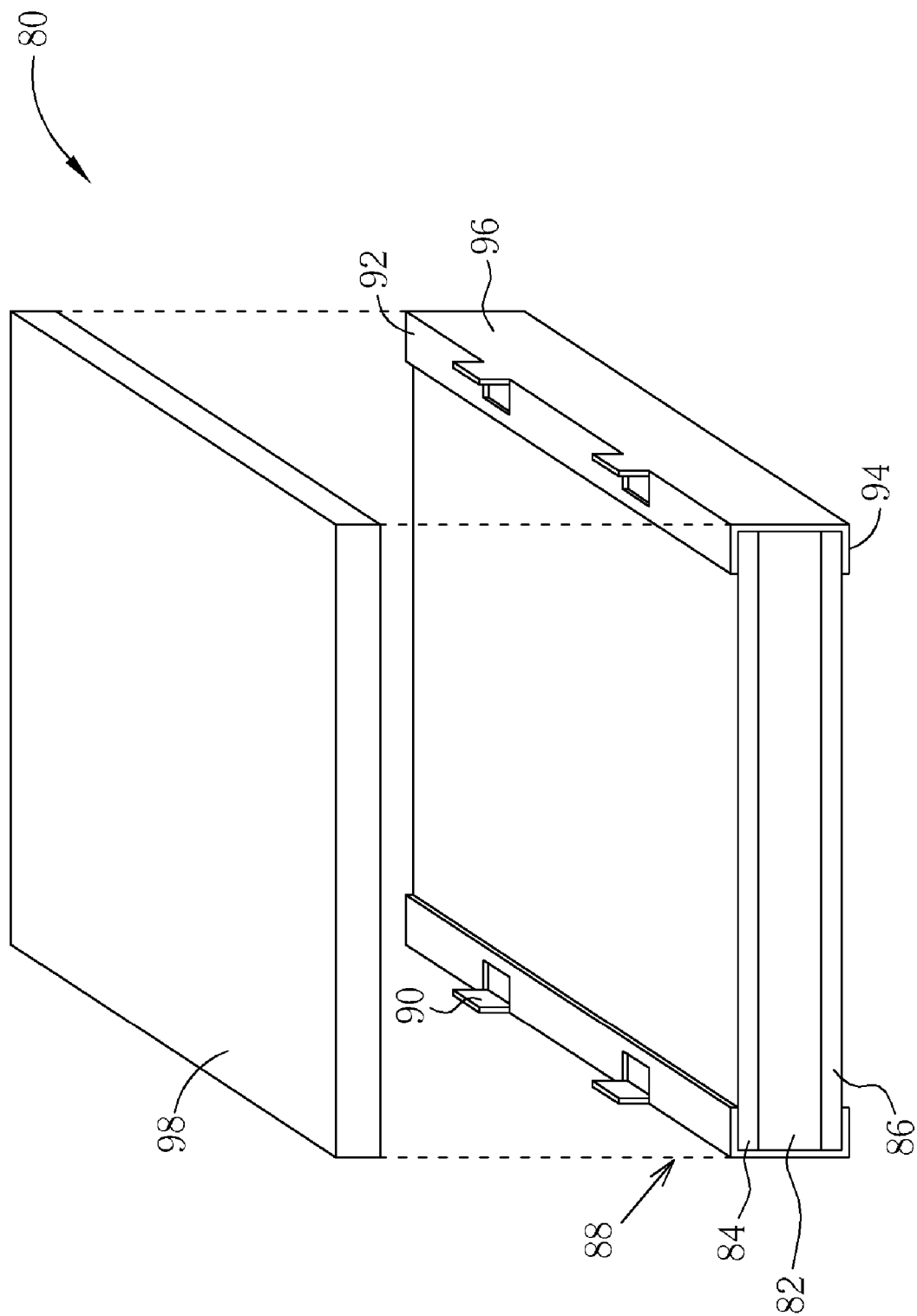
FIG. 4 is a diagram of a flat display module of a third embodiment according to the present invention.

Please refer to FIG. 4, which is a diagram of a flat display module 80 of a third embodiment according to the present invention. The flat display module 80 comprises a light guide plate 82, at least one optical film 84, a reflecting sheet 86, a flat display panel 98, and two fixing mechanisms 88. As shown in FIG. 4, each fixing mechanism 88 comprises a top fixing surface 92, a bottom fixing surface 94, a fixing sidewall 96, and a plurality of panel-fixing tabs 90 for fixing one side of the light guide plate 82, the optical film 84, and the reflecting sheet 86; In this embodiment, each fixing mechanism 88 is a bar-shaped mechanism, and its length is similar to the length of the fixed side of the guide plate 82.

Figure 5:
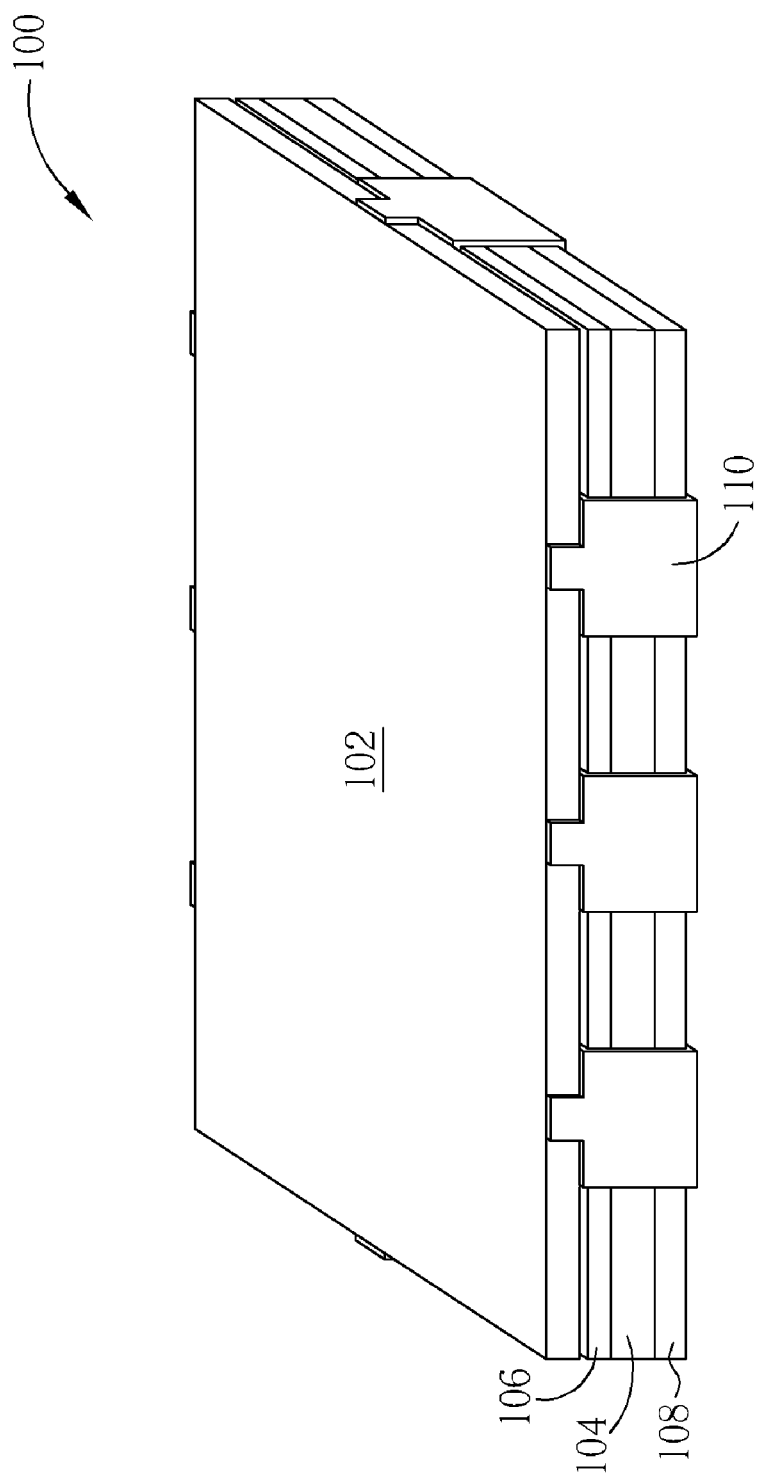
FIG. 5 is a diagram of a flat display module of a fourth embodiment according to the present invention.
Figure 6:
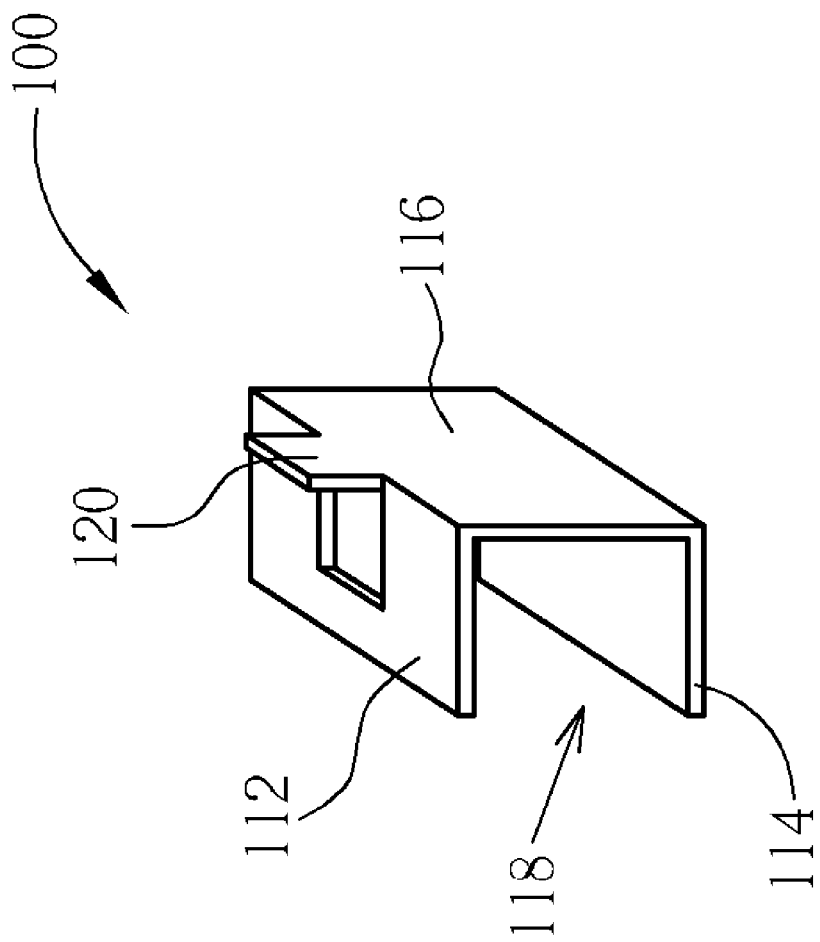
FIG. 6 is a diagram of the single-side fixing mechanism shown in FIG. 5

Please refer to FIG. 5 and FIG. 6. FIG. 5 is a diagram of a flat display module 100 of a fourth embodiment according to the present invention. FIG. 6 is a diagram of a single-side fixing mechanism shown in FIG. 5. As shown in FIG. 5, the flat display module 100 comprises a flat display panel 102, a light guide plate 104, an optical film 106, a reflecting sheet 108, and a plurality of single-side fixing mechanisms 110. The optical film 106 and the reflecting sheet 108 are respectively placed on the top and bottom of the light guide plate 104 while the flat display panel 102 is placed above the optical film 106. The single-sided fixing mechanism 110 comprises a top fixing surface 112, a bottom fixing surface 114, a fixing sidewall 116, and a panel-fixing tab 120, wherein the top fixing surface 112 and the bottom fixing surface 114 are connected to the fixing sidewall 116 in order to form fixing cavity 118. The fixing cavity 118 is utilized for placing and fixing one side of the light guide plate 104, the optical film 106, and the reflecting sheet 108. The length of each single-side fixing mechanism 110 is less than the length of the light guide plate 104. On the other hand, when the flat display panel 102 is placed above the optical film 106, the sidewall of the flat display panel 102 contacts the panel-fixing tab 120. Therefore, the flat display panel 102 is fixed above the optical film 106. Furthermore, in this embodiment, the above-mentioned fixing glue can also be utilized to strengthen the fixing power between the single-side fixing mechanism 110 and other devices.

Figure 7:
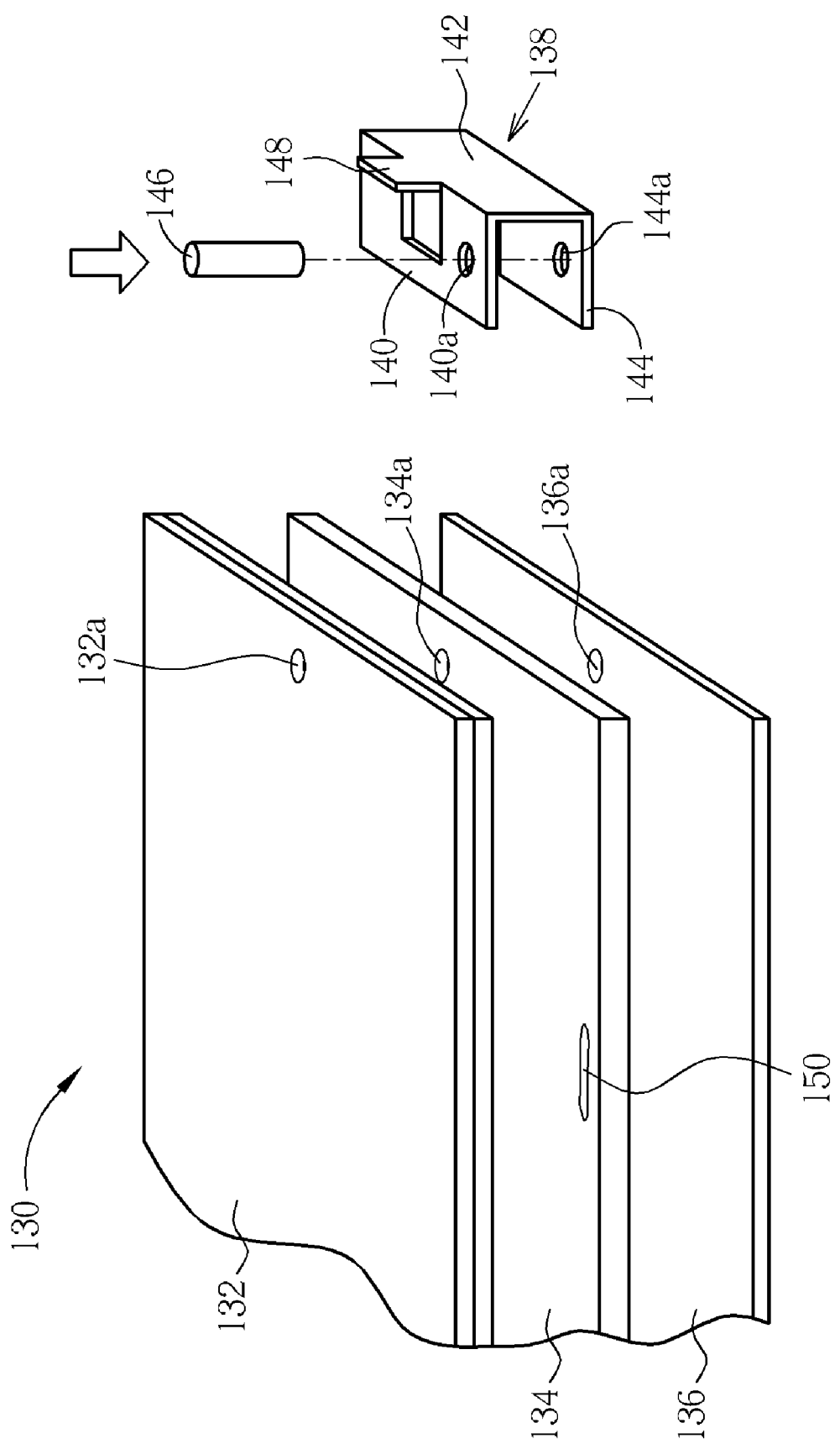
FIG. 7 is a flat display module of a fifth embodiment according to the present invention.

Please refer to FIG. 7, which is a flat display module 130 of a fifth embodiment according to the present invention. The flat display module 130 comprises a light guide plate 134, a plurality of optical films 132 placed on the top of the light guide plate 134, a reflecting sheet 136 placed on the bottom of the light guide plate 134, a flat display panel (not shown) placed on the optical films 132, and a plurality of singe-side fixing mechanisms 138 (in FIG. 7, only one single-side fixing mechanism 138 is shown).

Each single-side fixing mechanism 138 comprises a top fixing surface 140, a fixing sidewall 142, a bottom fixing surface 144, and a panel-fixing tab 148 for fixing the flat display panel. The single-side fixing mechanism 138 further comprises a fixing plug 146. The top fixing surface 140 and the bottom fixing surface 144 respectively comprise a plug hole 140a and 140b for placing the fixing plug 146 through the top fixing surface 140 and the bottom fixing surface 144. The optical film 132, the light guide plate 134, and the reflecting sheet 136 respectively comprise at least one fixing hole 132a, 134a, and 136a. When the optical film 132, the light guide plate 134, and the reflecting sheet 136 are placed inside the fixing cavity of the single-side fixing mechanism 138, the fixing holes 132a, 134a, and 136a correspond to the plug holes 140a and 144a of the single-side fixing mechanism 138. Therefore when the fixing plug 146 is moved in the direction indicated by the arrow, the fixing plug 146 is simultaneously placed through the top fixing surface 140, the optical film 132, the light guide plate 134, the reflecting sheet 136, and the bottom fixing surface 144 for fixing the optical film 132, the light guide plate 134, and the reflecting sheet 136.

The present invention flat display module 130 further comprises at least one fixing glue 150 placed between the light guide plate 134 and the optical film 132 for strengthening the fixing power between the light guide plate 134 and the optical film 132.

Plastic and elastic materials, such as plastics or metal, are used as the fixing mechanism of the present invention flat display module ensuring that the fixing mechanism can efficiently fix the light guide plate, the optical films, the reflecting sheet, and the flat display panel to replace the function of the frame. Furthermore, the top fixing surface, the bottom fixing surface, the fixing sidewall, and the fixing fragments of the fixing mechanism are a monolithic structure. This means that the top fixing surface, the bottom fixing surface, the fixing sidewall, and the fixing fragments are produced through injection molding or mechanical procedures. A simpler fixing mechanism production is achieved and the fixing mechanism can provide the function of fixing the flat display panel.

In contrast to the prior art, the present invention flat display module utilizes one or a plurality of fixing mechanisms for fixing other devices of the flat fixing display module. The frame utilized in the prior art can be replaced, allowing for a wider range of sizes and designs of the flat display module.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A flat display module comprising:
   a light guide plate comprising at least one plug hole;
   at least one fixing mechanism comprising:
      a top fixing surface with at least one plug hole;
      a bottom fixing surface;
      a fixing sidewall; and
      at least one panel-fixing member; wherein the top fixing surface, the bottom fixing surface, and the fixing sidewall are connected to each other for forming a fixing cavity to position the light guide plate and for fixing the edge of the light guide plate, and the at least one panel-fixing member is connected to the fixing sidewall;
   at least one fixing plug extending through the plug holes of the top fixing surface and the light guide plate; and
   a flat display panel placed above the at least one fixing mechanism and the light guide plate.

2. The flat display module of claim 1, wherein the at least one panel-fixing member is placed beside the sidewall of the flat display panel for fixing the flat display panel above the at least one fixing mechanism and the light guide plate.

3. The flat display module of claim 1, wherein the at least one panel-fixing member and the fixing sidewall share the same plane.

4. The flat display module of claim 1, wherein the bottom fixing surface comprises at least one plug hole for placing the fixing plug through the bottom fixing surface.

5. The flat display module of claim 1, wherein the at least one fixing mechanism is a hoof-shaped fixing mechanism.

6. The flat display module of claim 1, wherein the flat display module comprises the at least one fixing mechanism is a plurality of fixing mechanisms.

7. The flat display module of claim 6, wherein the fixing mechanisms are hoof-shaped, rectangular-shaped, or bar-shaped fixing mechanisms or combinations of the different shaped fixing mechanisms.

8. The flat display module of claim 1, wherein the at least one fixing mechanism is made of an elastic material for utilizing the elasticity of the material to fix the light guide plate.

9. The flat display module of claim 1, further comprising a reflecting sheet placed on a bottom surface of the light guide plate, and wherein the at least one fixing mechanism simultaneously fixes the light guide plate and the reflecting sheet in the fixing cavity.

10. The flat display module of claim 1, further comprising an optical film placed on a top surface of the light guide plate, wherein the one fixing mechanism simultaneously fixes the light guide plate and the optical film in the fixing cavity.

11. The flat display module of claim 10, further comprising fixing glue placed between the light guide plate and the optical film.

12. The flat display module of claim 1, further comprising fixing glue placed between the flat display panel and the at least one fixing mechanism.

13. The flat display module of claim 1, wherein the flat display panel is an LCD (liquid crystal display) panel.

14. A flat display module comprising:
   a light guide plate;
   at least one optical film placed above the top of the light guide plate;
   a reflecting sheet placed below the bottom of the light guide plate;
   at least one single-side fixing mechanism comprising:
      a top fixing surface;
      a bottom fixing surface; and
      a fixing sidewall;
      wherein the top fixing surface, The bottom fixing surface, and the fixing sidewall are connected to each other for forming a fixing cavity to place and fix one side of the light guide plate, the at least one optical film and the reflecting sheet, and the side length of the at least one single-side fixing mechanism is smaller than the side length of the light guide plate;
   a fixing plug extending through the light guide plate, the at least one optical film, and the reflecting sheet; and
   a flat display panel placed above the at least one fixing mechanism and the at least one optical film.

15. The flat display module of claim 14, wherein the at least one single-side fixing mechanism further comprises at least one panel fixing sheet connected to the fixing sidewall for fixing the flat display panel above the at least one fixing mechanism and the at least one optical film.

16. The flat display module of claim 15, wherein the at least one panel fixing sheet and the fixing sidewall share the same plane.

17. The flat display module of claim 14, wherein the light guide plate, the at least one optical film, and the reflecting sheet respectively comprise a plug hole, and the fixing plug extends through the plug holes of the light guide plate, the at least one optical film, and the reflecting sheet.

18. The flat display module of claim 14, wherein the top fixing surface comprises at least one plug hole, and the fixing plug extends through the at least one plug hole of the top fixing surface.

19. The flat display module of claim 14, wherein the bottom fixing surface comprises at least one plug hole, and the fixing plug extends through the at least one plug hole of the bottom fixing surface.

20. The flat display module of claim 14, wherein the at least one fixing mechanism is a plurality of fixing mechanisms.

21. The flat display module of claim 20, wherein one side of the light guide plate, the at least one optical film, and the reflecting sheet are fixed by the fixing mechanisms.

22. The flat display module of claim 14, wherein the at least one fixing mechanism is made of an elastic material having elasticity to fix the light guide plate and the at least one optical film.

23. The flat display module of claim 14, further comprising fixing glue placed between the light guide plate and the at least one optical film.

24. The flat display module of claim 14, further comprising fixing glue placed between the flat display panel and the at least one fixing mechanism.

25. The flat display module of claim 14, wherein the flat display panel is an LCD (liquid crystal display) panel.

* * * * *